United States Patent [19]
Jalbert

[11] 3,972,495
[45] Aug. 3, 1976

[54] AERIAL SLED

[76] Inventor: Domina C. Jalbert, 170 NW. 20th, Boca Raton, Fla. 33432

[22] Filed: July 30, 1973

[21] Appl. No.: 383,629

Related U.S. Application Data

[60] Division of Ser. No. 41,022, May 27, 1970, Pat. No. 3,749,337, which is a continuation-in-part of Ser. No. 867,116, Sept. 30, 1969, abandoned.

[52] U.S. Cl. ............................................... 244/145
[51] Int. Cl.² .......................................... B64D 17/02
[58] Field of Search ............... 244/145, 142, 138 R, 244/DIG. 1, 146

[56] References Cited
UNITED STATES PATENTS

| | | | |
|---|---|---|---|
| 2,759,694 | 8/1956 | Lemoigne | 244/145 |
| 3,524,613 | 8/1970 | Reuter et al. | 244/142 |
| 3,558,087 | 1/1971 | Barish | 244/142 |
| R26,427 | 7/1968 | Jalbert | 244/145 |

FOREIGN PATENTS OR APPLICATIONS

| | | | |
|---|---|---|---|
| 1,295,993 | 5/1962 | France | 244/145 |

*Primary Examiner*—George E. A. Halvosa
*Assistant Examiner*—Barry L. Kelmachter
*Attorney, Agent, or Firm*—Jack N. McCarthy

[57] ABSTRACT

An aerial device in the form of a wing having upper and lower flexible layers and a leading edge and a trailing edge, a wall of the wing having an opening facing outward from the bottom or a side of the wing forming an inlet for flow of pressurized air into the wing, and a normally open flexible valve for the opening closeable by the air pressure to seal the opening when pressurized air is admitted to the wing.

7 Claims, 13 Drawing Figures

AERIAL SLED

RELATED APPLICATION

This is a division of application Ser. No. 41,022, filed May 27, 1970, now U.S. Pat. No. 3,749,337 which is a continuation-in-part of a co-pending application Ser. No. 867,116 filed Sept. 30, 1969 now abandoned, by the present inventor.

BACKGROUND OF THE INVENTION

An aerial device known as a parafoil has been used successfully both for captive flight and free drops. In the captive flight mode, the parafoil may be utilized to suspend a payload in the atmosphere, the payload perhaps being a scientific instrument or other object. The parafoil can also be used in place of a parachute for return of a man or a load from the atmosphere or from space. An advantage of the parafoil is that it is relatively easy to achieve directional flight to a considerably greater extent than with a normal parachute. Such a parafoil is described and claimed in U.S. Pat. No. 3,285,546 issued to the present inventor on Nov. 15, 1966.

However, the parafoil is dependent for successful operation on high relative winds. The parafoil has an air foil shape which to be completely effective requires high relative wind. In the absence of such wind, it is a simple deceleration device, depending entirely on a flat bottom surface for glide.

The parafoil relies on a ram air scoop to keep it inflated. For cargo drops at very high speed, the cargo acts as a pendulum which swings back and forth during descent of the parafoil. If the cargo swings too much, the ram air scoop action is lost and the parafoil can collapse in these circumstances.

SUMMARY OF THE INVENTION

The present invention provides an aerial device which is inflated as a result of its use. The device is in the form of a hollow wing made of flexible material, the wing being closed except for an opening or openings through which air may enter the wing. A flexible valve is provided for the opening which valve is closeable by air pressure built up inside the wing when the wing is used.

It is a general object of the present invention to provide an aerial device which is not dependent on high relative winds for efficient operation and is not dependent on continuous ram air scooping action.

It is another object of the invention to provide an aerial sled which is inflated when used, which seals itself to remain inflated and which glides on a cushion of air.

A further object of the invention is to provide an aerial sled having a wing shaped like a mattress with one or more openings in the flexible wall of the wing to receive air pressurized by impact of the wing upon deployment of the wing, and a flutter valve for sealing each opening by the action of the pressurized air which enters the interior of the wing. Once the sled is inflated, the valves close to keep it sealed.

Another object of the invention is to provide an effective valve construction for closing openings in an aerial sled as pressure builds up inside the sled after impact upon deployment of the sled.

Still another, and no less important object of the invention is to provide an improved rib construction for an aerial sled wherein ribs and connecting material are integral portions of one piece of material.

Other objects of this invention will appear from the following description and appended claims, reference being had to the accompanying drawings forming a part of this specification wherein like reference characters designate corresponding parts in the several views.

ON THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 2:
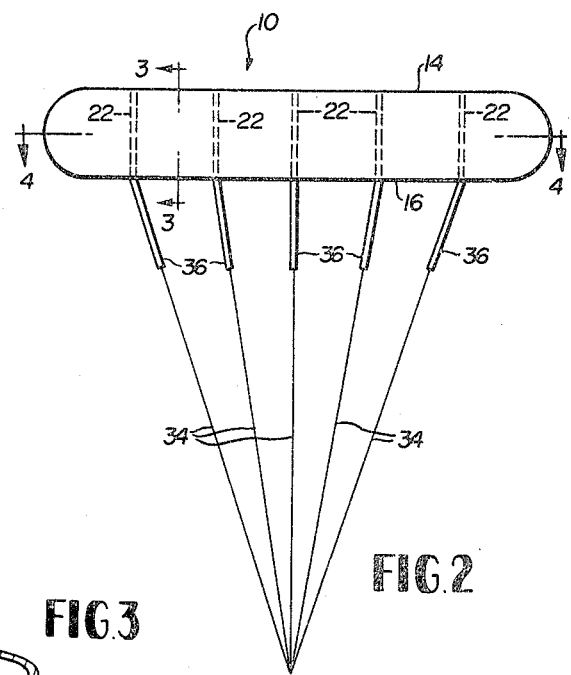
FIG. 2 is a front elevational view of the sled.
Figure 3:
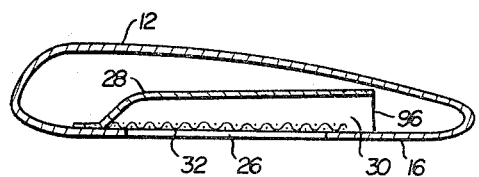
FIG. 3 is a cross sectional view of a sled taken along line 3—3 of FIG. 2.
Figure 4:
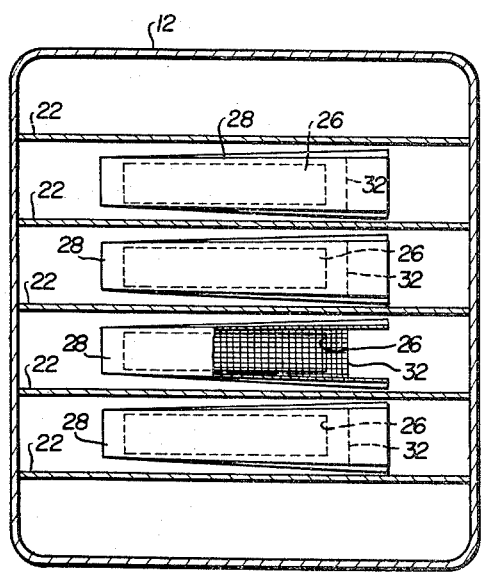
FIG. 4 is a horizontal sectional view of the sled taken along line 4—4 of FIG. 2.

Referring first to FIGS. 1 through 4, there is shown an aerial sled 10 in accordance with one form of the invention wherein the sled has a single wing section 12. The wing 12 has an air foil shape, but it is to be understood that the sled does not depend for maximum effectiveness on an air foil, so could have simply a mattress like shape. As shown in FIG. 4, the wing 12 may be square or rectangular, but these shapes may be modified slightly as will be described later.

The wing 12 has an upper flexible layer 14 and a lower flexible layer 16, and these layers merge together at the blunted ends of the wing which are the leading edge 18 and the trailing edge 20 of the wing. Inside the wing 12 there are a plurality of flexible ribs 22 (FIGS. 2 and 4) which extend transversely between the leading and trailing edges 18 and 20 in spaced parallel relation and are secured as by stitching to the upper and lower layers 14 and 16. The upper layer 14 may be referred to as a canopy and the lower layer 16 as a bottom closure. The ribs 22 divide the interior of the wing 12 into a plurality of cells, and the ribs give shape to the wing when it is inflated upon deployment.

As shown in FIGS. 3 and 4, at least one of the cells, and preferably a plurality of the cells, has an opening in a bottom or exterior side wall of the wing. In the embodiment illustrated in FIGS. 1 through 4, there are four such openings designated 26. Each of these openings 26 is provided with a flutter valve in the form of a layer of flexible material 28 which loosely covers the opening and forms a passage at 30 through which air under pressure may flow into the interior of the respective cell. The edges of the flexible material 28 are secured as by stitching to the lower layer 16 all around the opening 26 except at the passageway 30 so that air can only enter the cell through the passageway 30. The opening is also covered by a grill 32, one of which can be seen dashed in FIG. 4. The grill 32 may also be of flexible material to facilitate folding of the entire sled. The purpose of the grill is to provide a support for the flexible material 28 of the flutter valve when the valve closes.

When the sled is deployed, there is an impact during opening of the sled which builds up pressure under the lower layer 16. This pressure causes the valves 28 to open so that pressurized air can enter into the interior of the cells. Once pressure has built up inside the sled, the sled is inflated to the shape shown in the drawings, and the sled can then glide. Air pressure then drops outside of the lower layer 16 so the high pressure still existing inside the wing 12 presses the flexible material 28 against the grill and thus closes the passageway 30. Thus, all of the openings 26 are sealed by the flutter valve 28 due to the action of the pressurized air inside the wing 12. The valves remain closed during descent, so the wing stays pressurized to maintain flight. The valves also are effective to keep the sled inflated when it is used in tethered flight.

Figure 1:
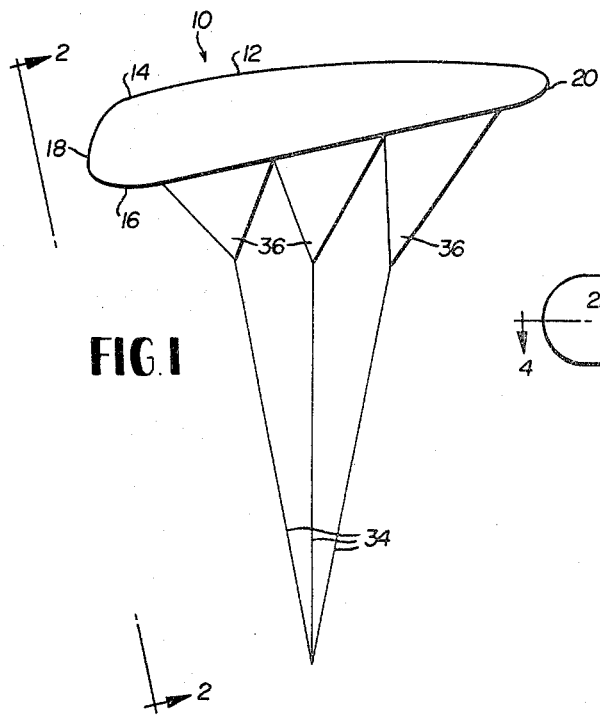
FIG. 1 is an elevational view of an aerial sled taken from one end of the sled.

As shown in FIGS. 1 and 2, the wing 12 is provided with shrouds 34 which are connected to the wing by triangular or wedge shaped flexible connectors 36, the flexible connectors being secured as by stitching to the lower layer 16 along the chord lines at the ribs 22.

As shown in FIG. 1, the connectors 36 may increase in size from left to right, and the length of the shrouds 34 may be adjusted to correspond with the connectors so that in the normal attitude of the wing 12 in flight, it is slanted slightly downwardly; that is, the leading edge 18 is lower than the trailing edge 20. This assures that once the sled is inflated, it will inevitably have a forward motion in the direction of the leading edge 18.

Figure 5:
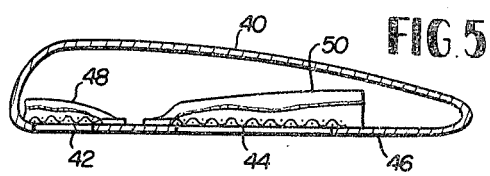
FIG. 5 is a cross sectional view showing a modified form of a wing for the sled having two openings and valves.

FIG. 5 is a sectional view of a modified form of wing for an aerial sled, the remainder of the sled being identical to that shown in FIGS. 1 and 4. Only the outline of a wing 40 is shown in FIG. 5, but it may be seen that there are two openings 42 and 44 in the lower layer 46 of the wing, each of these openings 42 and 44 being covered by a grill and also each being loosely covered by a flutter valve. The flutter valves are the flexible layers 48 and 50 which are constructed exactly like the flutter valve 28 described previously. It may be seen that the flutter valve 48 opens to the front of the wing and the flutter valve 50 opens toward the rear of the wing, thus assuring as even distribution of air throughout the wings after impact.

Figure 6:
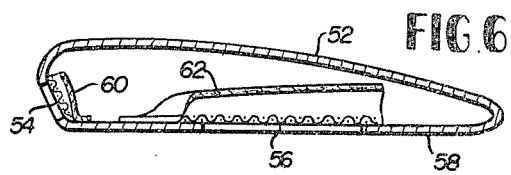
FIG. 6 is another modified form of a wing for the sled showing two differently arranged openings and valves.

FIG. 6 shows a similar modification wherein the wing 52 has one opening 54 at its leading edge and another opening 56 in its lower layer 58. These openings 54 and 56 are covered by grills and also are loosely covered by flutter valves 60 and 62 which are constructed exactly like those of 28 described previously. The purpose and operation of the openings 54 and 56 and the flutter valves 60 and 62 is identical with that described in connection with FIGS. 1 through 4.

Figure 7:
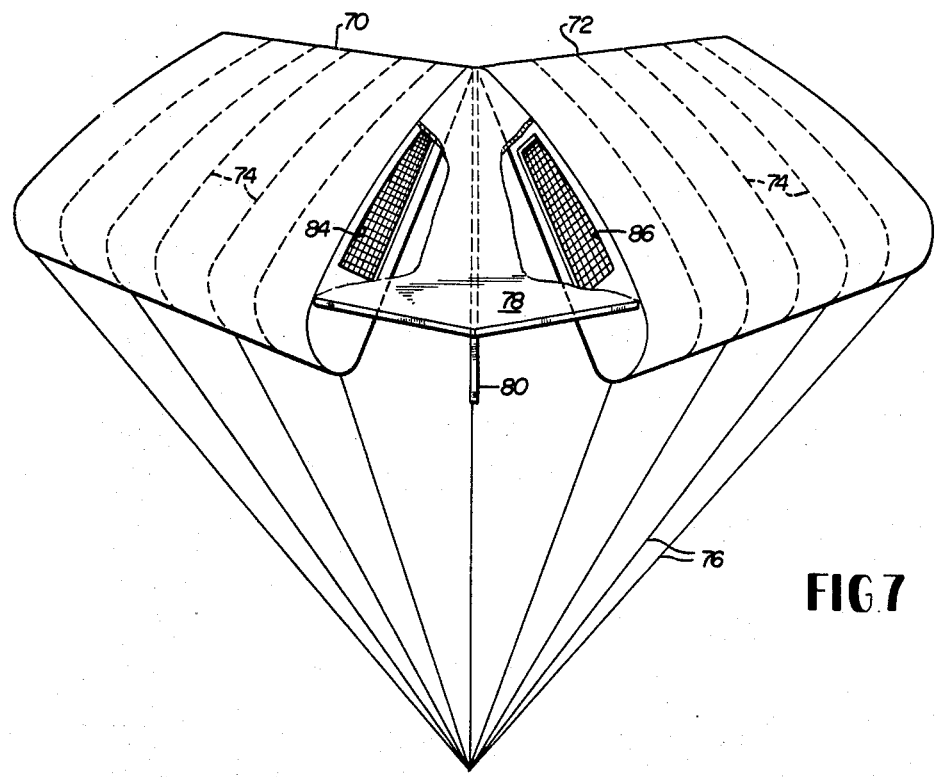
FIG. 7 is a perspective view of a sled having two wing sections arranged in a delta configuration.

FIG. 7 illustrates another embodiment of the invention. In this embodiment, there are two wing sections 70 and 72, each of which is constructed much like the wing 12 of FIGS. 1 through 4. Thus, the wings 70 and 72 have interior flexible ribs 74 which divide the hollow interior of the wing sections into cells. There are shrouds 76 connected to the bottom of the wing sections 70 and 72 by triangular connectors which are not visible, the connectors being secured to the lower layer of the wing sections along the chord lines of the ribs 74 in exactly the same manner as illustrated in FIGS. 1 and 2.

Figure 8:
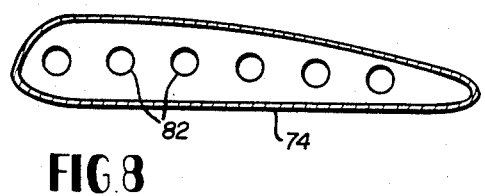
FIG. 8 shows an apertured rib for the wing sections of the sled of FIG. 7.

The two wing sections are connected together by a central web 78, and there is a central connector 80 attached to the web 78. It may be seen in FIG. 8 that the ribs 74 in this embodiment have openings 82 in them which permit flow of air from one cell to another within each of the wing sections 70 and 72. With this kind of rib construction, it is only essential to have one opening and valve for each of the wing sections. In the embodiment shown in FIG. 7, these openings are located at 84 and 86. The ribs 74 may be used in the other embodiments, and such ribs are used at least for the two end ribs in FIG. 4. Each of the openings 84 and 86 is covered by a grill, and there is a flutter valve for each of the openings inside the wing sections 70 and 72, the valve being constructed of a flexible layer identical to layer 28 in FIGS. 3 and 4. Thus, upon deployment of the sled, air is pressurized underneath the web 78 and enters through the openings 84 and 86 until pressure builds up inside of the wing sections 70 and 72 to inflate them. The wing starts to glide, pressure decreases under the wing sections after impact, and the increased pressure inside the wing causes the flutter valve to close, thus keeping the wing sections in an inflated condition. The sled can thus descend while it stays in an inflated condition.

The upper and lower layers of the sled are preferably made of a non-porous material so that the sled will float upon water if it should descend in water. The valves still remain closed even if the sled is floating in water, so the sled can even serve as a recovery platform in water.

All of the various layers of the sled including layers 14 and 16, ribs 22, valves 28, grills 32 and connectors 36 is FIGS. 1-4 (as well as the corresponding elements in the other views) may be made of textile material, but other materials are possible and the invention is not limited to a particular type of flexible material.

Figure 9:
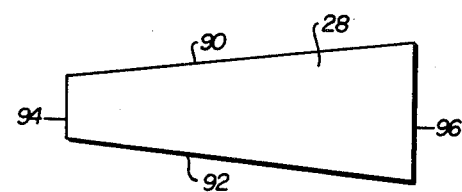
FIG. 9 shows a layer of material used as a valve in the sled.

The valves such as valves 28 may be made from flexible material having the initial shape shown in FIG. 9. This material is trapezoidal. The longer edges 90 and 92 and the shortest edge 94 are secured as by stitching to the material of layer 16 around the opening 26, and the material 28 is looped upwardly as in FIG. 3 to form the passage 30. The edge 96 overlaps the layer 16 outside of opening 26 so that it can be pressed against this material when the valve closes.

Figure 10:
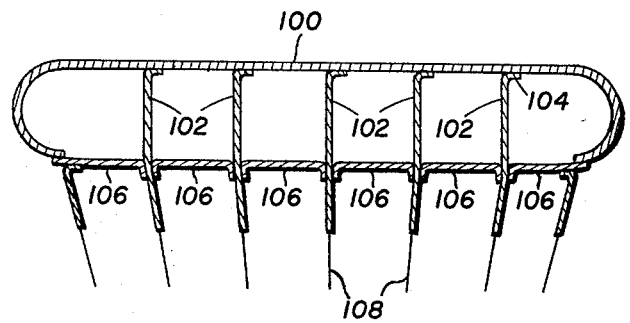
FIG. 10 is a cross sectional view of an aerial sled showing a preferred rib and connector construction.
Figure 11:
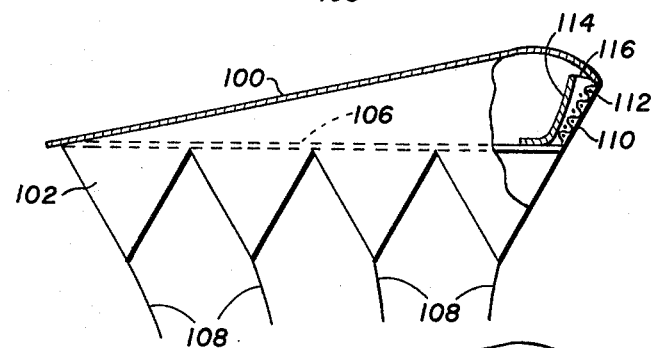
FIG. 11 is a longitudinal sectional view of the sled of FIG. 10 showing a single integral rib and connector piece partly broken away to reveal a valve.

FIGS. 10 and 11 are sectional views showing the manner in which ribs and connectors for an aerial sled may be made in one integral piece of flexible material. The sled of FIGS. 10 and 11 has an upper layer of material 100 to which rib and connector pieces 102 are stitched as at 104. The rib portion of each piece 102 is inside the sled, and the connector portions are outside the sled and have a pointed shape. The lower part of the sled has strips of material 106 stitched between the connector portions as shown to define the bottom layer or lower side of the sled. The shrouds 108 are attached to the connector portions of the pieces 102.

The trailing edge of the sled is closed but there is an opening at 110 at the leading edge of the sled (see FIG. 11). This opening is covered by a grill 112 which permits air to enter the cells or pressure chambers formed between each pair of ribs 102.

Behind each opening 110 and on the inner side of the grill 112, there is a flutter valve 114 for closing each of the openings 110 when pressure builds up inside the sled. The flutter valve 114 may be a piece of relatively impervious flexible material stitched to one of the lower strips 106 and to the ribs 102, but having a loose portion at its top end which allows air to enter at 116 until pressure builds up inside the sled, after which the inside air pressure closes the valve 114 against the grill 112 to seal the opening 110.

The aerial sled of FIGS. 10 and 11 operates in exactly the same manner as has been described previously herein, and this description will not be repeated. It is to be noted that the sled is capable of tethered flight as well as free falling descent. In tethered flight, the sled is inflated by wind pressure and stays inflated through the valve action. Thus, the sled may be flown something like a kite.

Figure 12:
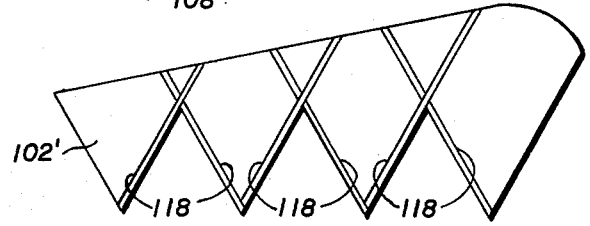
FIG. 12 shows an integral rib and connector piece provided with reinforcing webbing.

FIG. 12 shows a combination rib and connector piece 102' which is a single piece of material identical to piece 102 of FIG. 11, but having webbing strips 118 stitched along the angled vertical edges of the connector portions and then on up to the top edge of the piece for reinforcement purposes. Thus, the rib and connector element is still a single piece of material, but it has webbing strips 118 affixed thereto for reinforcement.

Figure 13:
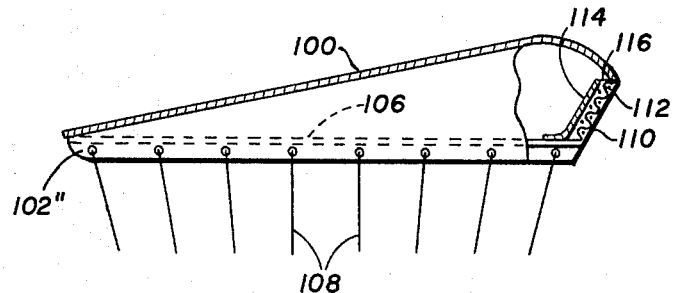
FIG. 13 is a sectional view of another embodiment.

FIG. 13 is a sectional view very similar to FIG. 11, the only difference being that the flares or points have been eliminated from the connector portion of piece 102''.

All of the pieces of material of the aerial sled and rib/connector shown in FIGS. 10, 11 and 12 may be made of flexible material such as textile material, plastic or the like. No attempt has been made to designate a particular flexible material in the drawings.

The sled thus provides an improved type of aerial device which has the advantage of being controllable to provide directional flight and yet which is very stable and relatively foul proof.

Having thus described my invention, I claim:

1. An aerial device comprising a flexible wing having upper and lower flexible walls, each wall having a forward edge and rearward edge, said rearward edges of said upper and lower flexible walls forming a wing trailing edge, said forward edges of said upper and lower walls being spaced apart forming first opening means at the forward edges, flexible side walls defining a hollow space with said flexible upper and lower flexible walls, said first opening means providing for a flow of air into said wing for pressurizing said wing, a first flexible valve means for said first opening means, said first flexible valve means being openable by said flow and closeable by air pressure in said wing, shroud means connected to said lower flexible wall, a second opening means being located in said lower flexible wall aft of said first opening means, and a second flexible valve means for said second opening means.

2. An aerial device as set forth in claim 1 wherein a grill means covers said opening means, said first and second flexible valve means being closeable against its grill means.

3. An aerial device as set forth in claim 2 wherein said first flexible valve means comprises flexible material fixed to a flexible wall on one side of said first opening means.

4. An aerial device as set forth in claim 2 wherein a plurality of flexible ribs connect the upper and lower flexible walls dividing the interior of said wing into a plurality of cells giving shape to the wing when it is pressurized.

5. A combination as set forth in claim 1 wherein connectors connect said shroud means to said lower flexible wall, a plurality of flexible ribs connect the upper and lower flexible walls dividing the interior of said wing into a plurality of cells giving shape to the wing when it is pressurized, said ribs extending through said lower flexible wall to form said connectors.

6. An aerial device as set forth in claim 5 wherein the portion of each rib extending through said lower flexible wall forms a wedge shaped connector.

7. An aerial device as set forth in claim 6 wherein a reinforcing strip is fixed along the edge of each wedge and is connected to the upper wall.

* * * * *